Aug. 31, 1954     J. W. M. DUMOND     2,688,094
POINT-FOCUSING X-RAY MONOCHROMATOR
FOR LOW ANGLE X-RAY DIFFRACTION
Filed May 9, 1952     2 Sheets—Sheet 1
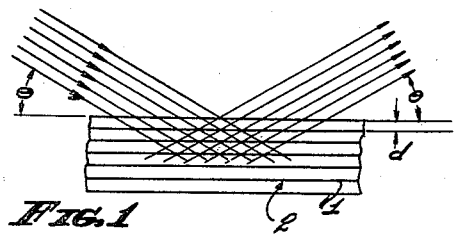
*FIG. 1*
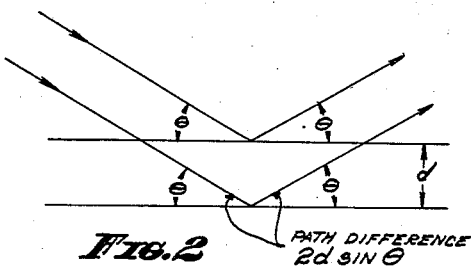
*FIG. 2*   PATH DIFFERENCE $2d \sin \theta$
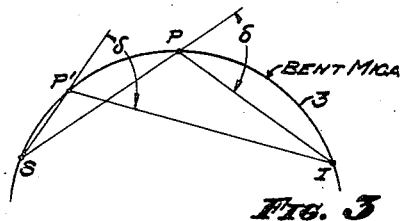
*FIG. 3*
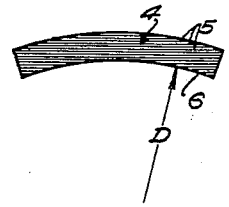
*FIG. 4*
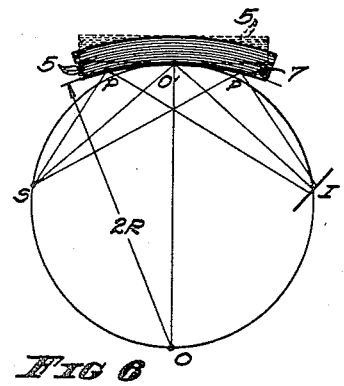
*FIG. 6*
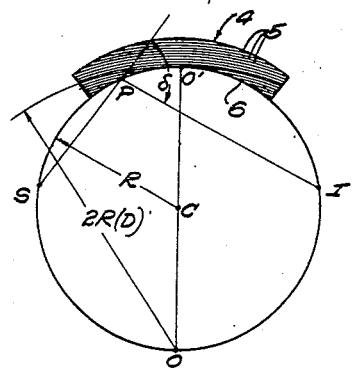
*FIG. 5*
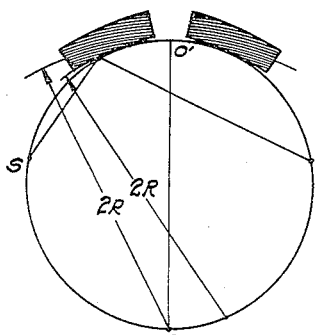
*FIG. 8*
*FIG. 7*
INVENTOR.
JESSE W. M. DUMOND
BY
*Lyon & Lyon*
ATTORNEYS

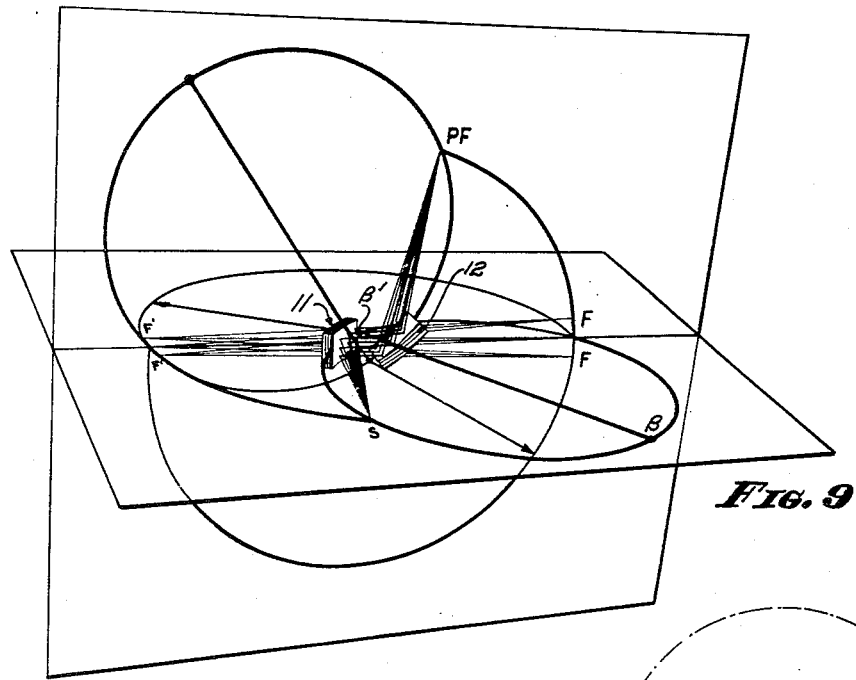
Fig. 9
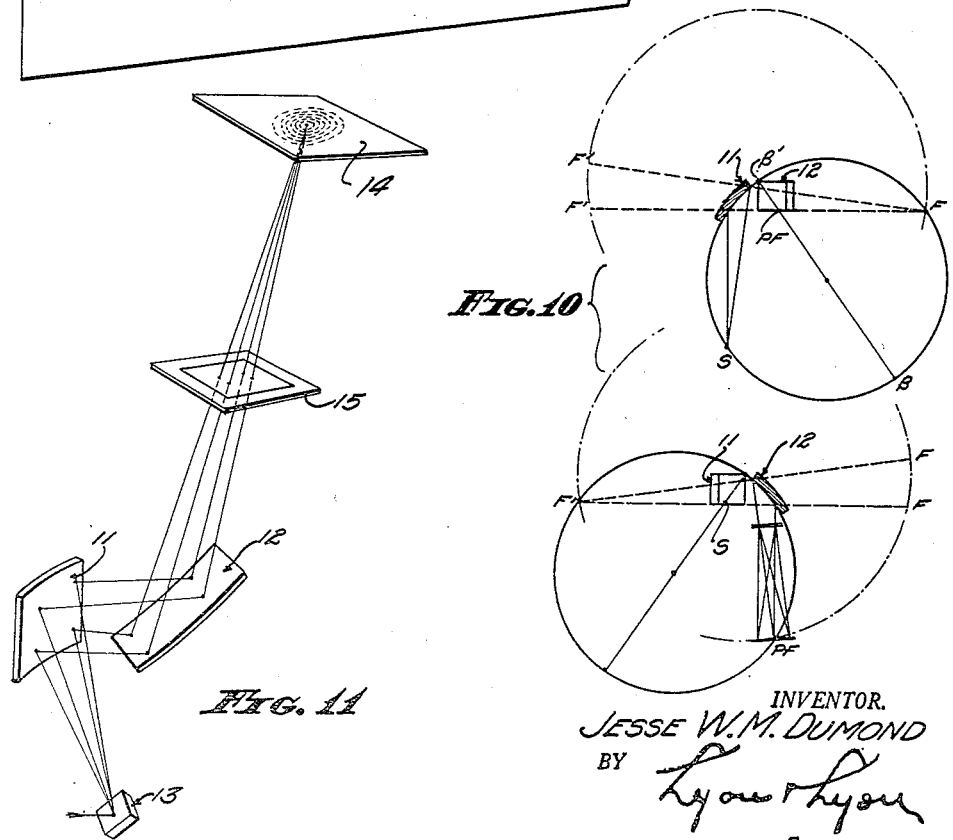
Fig. 10
Fig. 11
INVENTOR.
JESSE W. M. DUMOND
BY
ATTORNEYS Patented Aug. 31, 1954

2,688,094

UNITED STATES PATENT OFFICE 2,688,094

POINT-FOCUSING X-RAY MONOCHROMATOR FOR LOW ANGLE X-RAY DIFFRACTION

Jesse W. M. Dumond, Pasadena, Calif., assignor to California Institute Research Foundation, Pasadena, Calif., a corporation of California Application May 9, 1952, Serial No. 286,947

10 Claims. (Cl. 250—53)

My invention relates to a point-focusing X-ray monochromator for low angle diffraction and constitutes a continuation-in-part of my copending application Serial Number 207,967, filed January 26, 1951.

A primary object of my invention is to study the X-ray diffraction patterns of extremely small objects in such range of particle size that the diffraction patterns are included within a few degrees angle of deviation from the primary direction of the unscattered beam.

A further object of my invention is to provide an X-ray monochromator which achieves anastigmatic point focus by utilizing a pair of cylindrically bent crystals, such as quartz crystals, having focal circles which are mutually perpendicular, that is, the monochromator is so arranged that an X-ray beam emanating from an X-ray tube at a point on the focal circle of one crystal is reflected in succession from the two crystals into a resulting converging beam focusing to a point on the focal circle of the second crystal, a specimen being spaced in said converging beam and a photographic plate being placed at said focusing point to record the scattering of the X-ray beam caused by the specimen.

A still further object is to provide an X-ray monochromator which, by reason of its point focus as distinguished from line focus, greatly simplifies the interpretation of the intensity distribution produced by the specimen, that is, the diffraction pattern obtained is virtually the property of the specimen rather than extraneous factors.

A still further object is to provide a point-focusing X-ray monochromator wherein background fog due to incoherent scattering of the X-ray spectrum is reduced to a minimum, thus materially increasing the sensitivity of the apparatus, particularly when the intensity of the diffraction pattern powered by the scattered radiation is weak.

With the objects in view as may appear hereinafter reference is directed to the accompanying drawings in which:

Figure 1 is a diagrammatic view showing the manner in which a crystal effects selective reflection of X-rays.

Figure 2 is a diagrammatic view showing X-ray diffraction from two adjacent atomic planes of a crystal.

Figure 3 is a diagrammatic view illustrating the essential cylindrical curvature of a crystal in order to monochromatize and focus X-radiation.

Figure 4 is a diagrammatic view illustrating a crystal in its unstressed state.

Figure 5 illustrates the crystal shown in Figure 4 curved to meet the conditions for focusing X-radiation.

Figure 6 illustrates a modified crystal which produces an approximate focusing of X-radiation.

Figure 7 is a diagrammatic view showing the portions of crystal represented in Figure 5 as utilized in my X-ray monochromator.

Figure 8 is a diagrammatical view similar to Figure 7 showing the crystal represented in Figure 6 as utilized in my X-ray monochromator.

Figure 9 is a diagrammatic perspective view illustrating the arrangement of a pair of crystals employed to effect point-focusing of X-radiations.

Figure 10 is a composite view representing the horizontal and vertical planes depicted in Figure 8.

Figure 11 is a diagrammatic view illustrating the essential elements in my X-ray monochromator.

My X-ray monochromator utilizes the principle of the reflection type curved crystal spectrometer. X-ray selective reflection by crystals occurs in the atomic planes 1 of the crystal structure 2, as indicated in Figure 1. These planes act like a pile of reflecting layers, each similar to a mirror and uniformly spaced apart by the grating constant $d$ so as to reflect a specified wavelength $\lambda$, constructively or destructively according to the relation between the wavelength $\lambda$ and the path difference for reflection from two successive atomic planes. As in mirror reflection, the grazing angles of incidence and reflection made between the rays and the mirror planes must be equal. In addition, the path difference for the two successive mirrors which is seen from the geometry in Figure 2 to be $2d \sin \theta$ must be equal to a whole number of wavelengths $\lambda$ of the radiation for constructive interference to occur. Thus two conditions are required for constructive, selective reflection of X-rays by crystal lattice planes. First, equal angles $\theta$ of incidence and reflection, and, second, both these angles $\theta$ must be related to the wavelength $\lambda$ selected by the equation $$n\lambda = 2d \sin \theta$$

where $n$ is a whole number (1, 2, 3, etc., the "order" number) and $d$ is the interplanar distance characteristic of the particular set of atomic planes in the particular crystal used. Another way of stating these two conditions is to say that, first, the angle of deviation $\delta = 2\theta$ of the X-ray beam by the crystal must have a fixed value for any given wavelength, this value being given by $$n\lambda = 2d \sin \frac{\delta}{2}$$

and, second, the reflecting planes must bisect this angle of deviation. In the exercising of my invention, it is necessary to bend a crystal so as to make it satisfy both of the above conditions everywhere over its bent surface in order that it will both monochromatize and focus X-radiation emanating from a source point to an image point.

With reference to Figure 3, a sheet of mica 3 may be bent cylindrically. From the well-known property of a circular arc described through points S and I, this is the curve which will insure that the deviation angle $\delta$ shall be everywhere constant so that one of the two required conditions is thus satisfied. But the other condition, namely, that the atomic planes shall bisect the angle $\delta$ is only strictly fulfilled at the center of the arc P, and as one approaches S or I at other points P', the condition is violated worse and worse. This condition is overcome and exact focusing, which satisfies both conditions of selective reflection over a definite area of a curved crystal, may be accomplished as shown in Figures 4 and 5. A slab of crystal 4 in the unstressed state, that is, with its atomic planes 5 flat, is given a cylindrical concave profile 6 of a radius equal to the diameter of the circle shown in Figure 5. The crystal is then stressed until its concave surface 6 is equal to the radius of the circle shown in Figure 5 so that its atomic planes 5 define cylinders having a common center at O. Upon examination of Figure 5, it will be seen that at all points P of the concave surface both conditions are fulfilled for a source point S and an image point I equidistant from O. The constancy of the angle of deviation $\delta$ is fulfilled as before. $\delta$ can be chosen to correspond to any wavelength and grating constant $d$ in accordance with the equation above by the approximate choice of the magnitude of the equal arcs SO and IO. Also clearly $\delta$ is bisected at every point P by the direction at that point of the atomic planes 5. This can be seen because these curved planes have been made into concentric cylinders with the common center O and are, therefore, normal to the radius OP. But the radius OP bisects the angle SPI because the subtended arcs SO and OI are equal (by construction), and hence the direction of the planes, which is normal to this radius, must bisect the angle which is the supplement of the angle SPI. The circle OSPO'I is called the "focal circle."

Actually one can obtain an approximate solution to the above problem without profiling a crystal to a curvilinear profile in the unstressed state. If one wishes to approximate the solution in a region near O', the point diametrically opposite O, one may start with a flat slab of crystal 7 whose reflecting atomic planes 5 are parallel to the flat face and bend to a radius of curvature equal to the diameter of the focal circle as shown in Figure 6. It will thus be seen that for a short arc on either side of O', the deviation of the position of the reflecting crystal from coincidence with the focal circle introduces a negligible broadening of the focal point I. That is, the planes 5 are bent so that they have the right direction, are displaced a little way from the right position with a consequent slight displacement of the position at which they are focused. This aberration does not become large until point P is at some distance from O'.

If it is desired to obtain the exact solution in some region off-center, as for example in the region indicated by 8 in Fig. 7, which is not at O' but considerably to one side, one may of course utilize an off-center piece of a crystal cut to the curved form 4 shown in Fig. 4 and bent in the same way as this part of the crystal was bent in Fig. 5. Such a bent off-center piece is shown at 8 in Fig. 7. The geometry of the curved crystal planes and their inclinations at the curved concave reflecting surface is in this case identical in the piece of crystal 8 of Fig. 7 and the corresponding region of the complete crystal Fig. 5.

If however a simpler type of approximate solution similar in principle to that illustrated in Fig. 6 is desired for the case of an off-center piece or arc of crystal, approximate focusing may be obtained without the necessity for cutting a curved slab of crystal in the unstressed state (such as that shown at Fig. 4) by the following procedure. One starts with a crystal cut in the unstressed state in the form of a flat slab but with its atomic reflecting planes making a slight angle with the flat surface of the slab. In such an approximate solution this angle is taken equal to the angle between the atomic planes and the concave curved boundary surface at the mid-point of the off-center piece of crystal for the exact solution shown in Fig. 7. This flat slab is then bent until its erstwhile flat surface is now of a radius of curvature equal to the diameter of the focal circle and in this bent state its mid-point is placed tangent to the focal circle. Two such slabs satisfying this approximate solution are shown in Fig. 8 from which it will be clear how the atomic planes will have the appropriate curvatures to simulate the exact case of Fig. 5. The chief error will consist in the slight departure of the concave surface of the crystal from rigorous contact with the focal circle (except at the point of tangency between crystal and focal circle) and an entirely similar focal broadening due to this departure will result as that illustrated for the centered case in Fig. 6.

Reference is now directed to Figures 9 and 10. In the exercise of my invention, I utilize two crystals 11 and 12, each corresponding to the section of crystals shown in Figure 7 and having the construction shown in Figure 5 or approximately the arrangement shown in Figure 6, but with the initially flat atomic plane making the approximate angle with the surface of the crystal. The crystals are disposed with the planes of their focal circles in mutually perpendicular relation. Crystal 11 is situated tangent to its horizontal focal circle $\beta S\beta'$ where $\beta'$ is the point diametrically opposite the center of curvature $\beta$ of the atomic planes.

To insure anastigmatic point focusing it is essential to construct what we shall here term the image circles for each of the two focusing curved crystals. The image circles shown in Figs. 9 and 10 are constructed say for the crystal, 11, the one with the horizontal focal circle, by taking the point $\beta'$ (corresponding to the point O' in Figs. 4 to 8) as center and a radius equal to the distance $\beta'S$, or its equal $\beta'F$ and striking an arc (greater than 180°) in the plane of the focal circle extending from the source point, S, to the focal point, F. Identically similar construction is used for the image circle associated with the crystal 12 having its focal circle in a vertical plane.

The short arc F'F'' on the horizontal image circle whose center is at $\beta'$ and whose radius is $\beta'S$, is the locus of points which are the images of S specularly reflected from the atomic reflecting planes where they meet the concave surface of the curved crystal 11. Because of the bending of these atomic planes, they are actually arcs of concentric cylinders with a common vertical axis passing through the point β in the horizontal focal circle. Only one of the atomic planes is truly tangent to the horizontal focal circle at the point β'.

Because the bent segment of crystal is situated entirely to one side of β', the atomic planes (cylinders) make an acute angle with the surface of the bent crystal. After selective reflection in the atomic planes of crystal 11, the X-rays pass to crystal 12. In doing so, they diverge vertically as though they came from the virtual image lying along the horizontal arc F'F', but they simultaneously converge horizontally as though directed at points along the vertical segment FF. This latter convergence is imposed by the focusing action of the bent crystal 11. The arc FF passes through the image point conjugate to S on the horizontal focal circle. This point on the horizontal focal circle is the point of mirror symmetry, relative to S reflected in the diameter β'. After the rays have been reflected from curved crystal 12, they converge to the anastigmatic point focus PF.

It will be observed that the system is completely symmetric, the vertical focal circle and image circle for crystal 12 being exactly like the horizontal focal circle and image circle for crystal 11. Each bent crystal is situated entirely on one side of the β' symmetry point for the bending of its planes so that for any specified wavelength each crystal has one conjugate focus (the "long arm focus") which is at a greater distance from the center of the bent crystal lamina than the other focus (the "short arm focus"). It is seen then that the anastigmatic point-focusing solution is obtained by placing the focal circles of the two curved crystals in mutual perpendicular planes and making the long arm focus for each crystal coincide with the center of the image arc corresponding to the short arm focus of the other crystal.

Reference is now made to Figure 11. The X-radiations may emanate from a target 13 of an X-ray tube (not shown). These rays diverge to the first crystal 11, then converge in a vertical plane and diverge in a horizontal plane to crystal 12, and they are then caused to converge in both planes to its focal point. At this point there is placed a photographic plate 14. Between the photographic plate 14 and crystal 12 is placed a slide 15 or other means for supporting a specimen transparent to the X-rays.

The specimen is in the form of a thin wafer of the material to be studied. If a completely point-like focus is achieved in the absence of a scattering specimen, then when the specimen is inserted, the diffracted X-rays will form a pattern around the original point-focus on the photographic film placed at the focus normal to the central ray of the beam.

For example, if the specimen consists of small spheres randomly arranged relative to each other, the diffraction pattern will consist of concentric rings, the measurement of whose diameters along with the specimen-to-film distance and a knowledge of the X-ray wavelength will give the diameters of the small spheres.

A particular batch of latex consisted of spheres of particular uniformity. Diffraction was observed to the twentieth order ring and measurement of their diameter determined it to be 2689 angstrom units plus or minus 3 angstrom units, providing substantially greater accuracy than had been previously obtained.

A particular advantage of my point-focusing monochromator (as distinguished from a line-focusing monochromator) is that my monochromator permits the study of diffraction patterns in two directions so that if the objects studied have structure which is different in different directions, as is frequently the case in biological specimens, this fact can be revealed immediately.

By use of the two crystal reflecting surfaces, the diffuse (non-selective) scattering from the last crystal is greatly reduced relative to the selectively reflected monochromatic intensity. The reduction of this background of diffuse scattering permits the study of much fainter or weaker low angle diffraction patterns. This is due to the fact that the reflection by the first crystal eliminates the great bulk of the continuous X-ray spectrum incident on the second crystal.

Having fully described my invention, it is to be understood that I do not wish to be limited to the details herein set forth, but my invention is of the full scope of the appended claims.

I claim:

1. A point-focusing X-ray monochromator comprising: a pair of X-ray diffraction crystals in the form of cylindrical segments and relatively disposed so that their concave surfaces at least touch focal circles in adjacent mutually perpendicular relation and each crystal having in the region of its concave surface curved atomic planes approximately tangent to the corresponding focal circles; a source of X-rays adapted to be directed in a beam for reflection from one of said crystals onto the other whereby said beam is caused to converge from said second crystal to a substantially point-focus; and means for mounting a specimen in the path of said converging X-ray beam.

2. A point-focusing X-ray monochromator comprising: a pair of X-ray diffraction crystals, each crystal defining a focal circle which is the locus of foci of different wave lengths selected by reflection on said crystal, said crystal being bent so that its atomic planes define cylindrical segments concentric about a common axis which lies on said focal circle, said atomic planes forming acute angles with the surface of said crystal; means disposing the focal circles of said crystals in mutually perpendicular adjacent relation; a substantially point-like source of X-rays adapted to direct diverging X-ray beams against one of said crystals to cause the reflected beam to converge relative to one axis and diverge relative to its other axis, said second crystal disposed so as to redirect said beam substantially unmodified in its converging axis and to converge the previously diverging axis of said beam, whereby the resulting beam focuses to a substantially anastigmatic image point; and means for mounting a specimen in said final converging X-ray beam.

3. A point-focusing X-ray monochromator as set forth in claim 1 wherein the concave surface of each crystal has a radius approximately R and its crystalline atomic planes have the radius approximately 2R where R is the radius of the focal circle of said crystal.

4. A point-focusing X-ray monochromator as set forth in claim 2 wherein the concave surface of each crystal has a radius approximately R and its crystalline atomic planes have the radius approximately 2R where R is the radius of the focal circle of said crystal.

5. A point-focusing X-ray monochromator as set forth in claim 2 wherein the concave surface of each crystal and its atomic planes have a radius approximately 2R where R is the radius of the focal circle tangent to said crystal and passing through said source point and image point.

6. A point-focusing X-ray monochromator comprising: a pair of cylindrically bent crystals, the atomic planes in the region of the concave surface of each crystal defining a cylindrical focal circle, one of said crystals being disposed with its focal circle in a horizontal plane, the other crystal being disposed with its focal circle in a vertical plane; means for producing an X-ray beam from a predetermined point lying on the focal circle of said first crystal for reflection in succession from said first crystal and said second crystal to a substantially point focus in the focal circle of said second crystal; means for disposing a photographic film at said point focus; and means for disposing a specimen between said second crystal and said point focus.

7. A point-focusing X-ray monochromator as set forth in claim 6 wherein the concave surface of each crystal has a radius approximately R equal to the radius of its focal circle and said atomic planes have radii substantially 2R.

8. A point-focusing X-ray monochromator comprising a pair of cylindrically curved selectively diffracting crystals for X-rays, each crystal defining a focal circle, said focal circle being the locus of focal points at which X-radiation of different wavelengths is focused by selective X-ray diffraction from the curved atomic crystal planes; each of the two crystals having its atomic reflecting panes curved so as to form a set of concentric right circular cylinders with a common central axis located normal to the plane of and at a point (hereinafter called the $\beta$-point) on the focal circle for that crystal, the central point of the arc of the focal circle occupied by each crystal being displaced from a point (hereinafter called the $\beta'$-point) situated diametrically opposite to the $\beta$-point on the focal circle and said displacement of the crystal arc being of sufficient amount to insure that the $\beta'$ point falls completely outside said crystal arc; each of the two crystals, because of its displacement from the $\beta'$ point having, for X-radiation of a specified wavelength, two conjugate foci on its focal circle equidistant from the $\beta'$ point, one of these foci (hereinafter called the short-arm focus) being nearer to the center of the crystal than the other focus (hereinafter called the long-arm focus); each of the two focal circles being disposed in mutually perpendicular planes so that the lines joining the centers of the reflecting arcs of each crystal to its long-arm focus coincide with each other and with such a spacing between the two crystals as to make the long-arm focus of each crystal coincide with the image point of the short arm focus of the other crystal, said image point being defined by a mirror reflection of said short arm focal point in a plane tangent to the curved atomic reflecting planes of that crystal at the mid-point of the crystal arc; a source of X-rays placed at one of the short arm foci of one of the crystals and adapted to have the rays directed in a beam for reflection from that crystal onto the other crystal whereby said beam is caused to converge from said second crystal to a substantially anastigmatic point focus; means for mounting a specimen in the path of said converging X-ray beam; and means placed at the converging point focus for studying the low-angle X-ray diffraction pattern formed by the diffraction of the radiation traversing said specimen.

9. A point-focusing X-ray monochromator comprising: a pair of cylindrically bent crystals, each crystal defining a focal circle and bent to cause its atomic planes to define cylindrical segments having a common axis situated on said focal circle and normal to its plane, said atomic planes forming acute angles with the surface of said crystal, one of said crystals being disposed with its focal circle in a horizontal plane, the other crystal being disposed with its focal circle in a vertical plane; means for producing an X-ray beam radiating from a predetermined point lying on the focal circle of said first crystal for selective X-ray reflection in succession from said first crystal and said second crystal to a substantially point-like focus in the focal circle of said second crystal; means for disposing a specimen in the converging X-ray beam between said second crystal and said point focus; and means for disposing an X-ray sensing device at said point focus so as to permit study of the low-angle diffraction pattern from said specimen.

10. A point-focusing X-ray monochromator as set forth in claim 9 save that in the unstressed state each crystal is a flat slab and, after bending, the concave surface of each crystal has a radius approximately equal to the diameter of its focal circle said concave surface being tangent to the focal circle at the midpoint of the crystal arc, the atomic planes to be used for the X-ray reflection in said crystal making an acute angle with its surface in such a way that, after bending, said atomic planes substantially form a system of concentric right circular cylindrical arcs having a common axis on the focal circle and normal to its plane.

References Cited in the file of this patent

UNITED STATES PATENTS

| Number | Name | Date |
| --- | --- | --- |
| 2,540,821 | Harker | Feb. 6, 1951 |
| 2,557,662 | Kirkpatrick | June 19, 1951 |

OTHER REFERENCES

"High Intensity X-Ray Monochromator" by P. Kirkpatrick, Review of Scientific Instruments, pages 552–554, November 1941.